United States Patent
McQuaide, Jr. et al.

(10) Patent No.: US 7,535,997 B1
(45) Date of Patent: May 19, 2009

(54) SYSTEMS AND METHODS FOR SILENT MESSAGE DELIVERY

(75) Inventors: A. Chester McQuaide, Jr., Berkeley Lake, GA (US); Maria Adamczyk, Alpharetta, GA (US); Scott C. Holt, Decatur, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 605 days.

(21) Appl. No.: 10/208,151

(22) Filed: Jul. 29, 2002

(51) Int. Cl.
*H04M 11/00* (2006.01)
(52) U.S. Cl. .............................. 379/88.14; 379/88.16
(58) Field of Classification Search ................ 379/67.1, 379/88.13, 88.14, 88.17, 88.22–88.26
See application file for complete search history.

(56) References Cited

U.S. PATENT DOCUMENTS

| | | | |
|---|---|---|---|
| 6,374,223 B1* | 4/2002 | Donaldson et al. ........... 704/260 |
| 6,411,684 B1* | 6/2002 | Cohn et al. ............... 379/88.14 |
| 6,507,643 B1* | 1/2003 | Groner .................... 379/88.14 |
| 6,765,997 B1* | 7/2004 | Zirngibl et al. .......... 379/88.18 |
| 6,785,266 B2* | 8/2004 | Swartz ....................... 370/352 |
| 6,895,084 B1* | 5/2005 | Saylor et al. ............. 379/88.22 |
| 6,996,212 B1* | 2/2006 | Baker et al. .............. 379/88.22 |
| 7,190,950 B1* | 3/2007 | Baker et al. ................. 455/413 |
| 7,212,614 B1* | 5/2007 | Burg et al. ............... 379/88.18 |
| 7,369,649 B2* | 5/2008 | Zhong ..................... 379/88.27 |
| 2003/0035412 A1* | 2/2003 | Wang et al. .................. 370/352 |
| 2003/0135569 A1* | 7/2003 | Khakoo et al. ............. 709/206 |
| 2005/0191994 A1* | 9/2005 | May et al. ................ 455/412.2 |
| 2006/0013368 A1* | 1/2006 | LaBaw .................... 379/88.13 |
| 2008/0075244 A1* | 3/2008 | Hale et al. ............... 379/88.13 |

* cited by examiner

*Primary Examiner*—Curtis Kuntz
*Assistant Examiner*—Joseph T Phan
(74) *Attorney, Agent, or Firm*—Thomas, Kayden, Horstemeyer & Risley, LLP (57) ABSTRACT

Systems and methods for silent message delivery are provided. One such embodiment includes a message receiver configured to receive a text message and convert it to a corresponding speech message. A message router is connected to the message receiver and configured to route the speech message dependent on information included in the speech message in accordance with a messaging directory. Preferably, a Voice Profile for Inter-system Messaging (VPIM) agent is connected to the message router and configured to convert the speech message to a corresponding VPIM message and deliver it to a voice mail system. Methods are also provided for delivery of a text message as speech message to a voice mail system without initiating a call to a telephonic device.

9 Claims, 9 Drawing Sheets

SYSTEMS AND METHODS FOR SILENT MESSAGE DELIVERY

FIELD OF THE INVENTION

The present invention is generally related to telecommunications and more particularly to systems and methods for message delivery.

BACKGROUND OF THE INVENTION

The telecommunications industry has advanced over time to offer many services that enhance or expand traditional voice telephone communications. Networked voice mail systems are a prime example of such advancements. Typically, networked voice mail systems provide all of the features of local answering machine systems along with a number of additional useful features. For example, some networked voice mail systems may submit a voice or text notification to the subscriber (e.g., to a cell phone or pager) that advises of the receipt of voice messages by the voice mail system. As another example, some networked voice mail systems may offer the subscriber the capability to review, reply to, and/or forward voice messages from any location using a telephone. As yet another example, some networked voice mail systems offer the capability to receive and manage messages for multiple subscribers within a common organization, such as a corporate office.

Existing networked voice mail systems are typically only accessible to submit or retrieve messages using voice telephone communications (e.g., a telephone connected to a public telephone system). Furthermore, the option to submit a message to a networked voice mail system is typically available only after a call is made to the subscriber's telephone but not answered. However, there are situations when the use of voice telephone communications to submit a message to a subscriber's networked voice mail system is impractical and/or inconvenient. For example, a message sender may wish to submit a message to a networked voice mail system without disrupting or disturbing the subscriber by making a call to the subscriber's telephone. As another example, a message sender may wish to thoroughly review a message, for example to verify the content, grammar, etc., before submitting the message to a subscriber's networked voice mail system. The needs that arise in these and other similar situations are not sufficiently satisfied by existing systems and methods for networked voice mail.

Therefore, it should be appreciated that there is a need for systems and methods for networked voice mail which address the above-mentioned shortcomings, as well as others, of existing systems and methods.

SUMMARY OF THE INVENTION

The present invention provides systems and methods for silent message delivery.

Briefly described, one embodiment of the system, among others, includes a message receiver unit configured to receive a text message and convert it to a corresponding speech message. A message router unit is connected to the message receiver unit and configured to route the speech message dependent on information included in the speech message. Preferably, a Voice Profile for Inter-system Messaging (VPIM) agent unit is connected to the message router unit and is configured to convert the speech message to a corresponding VPIM message and deliver it to a voice mail system.

The present invention can also be viewed as providing a computer program that includes logic configured to receive a text message from a message source. The computer program further includes logic configured to convert the text message to a corresponding speech message and logic configured to deliver the speech message to the voice mail system of an intended recipient without initiating a call to a telephonic device.

The present invention can also be viewed as providing methods for silent message delivery. In this regard, one embodiment of such a method, among others, can be broadly summarized by the following: receiving a text message from a message source, converting said text message to a corresponding speech message, and delivering said speech message to the voice mail system of an intended recipient without initiating a call to a telephonic device.

Other systems, methods, features, and advantages of the present invention will be or become apparent to one with skill in the art upon examination of the following drawings and detailed description. It is intended that all such additional systems, methods, features, and advantages be included within this description and be within the scope of the present invention.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

The invention now will be described more fully with reference to the accompanying drawings. The invention may, however, be embodied in many different forms and should not be construed as limited to the embodiments set forth herein; rather, these embodiments are intended to convey the scope of the invention to those skilled in the art. Furthermore, all "examples" given herein are intended to be non-limiting.

Figure 1:
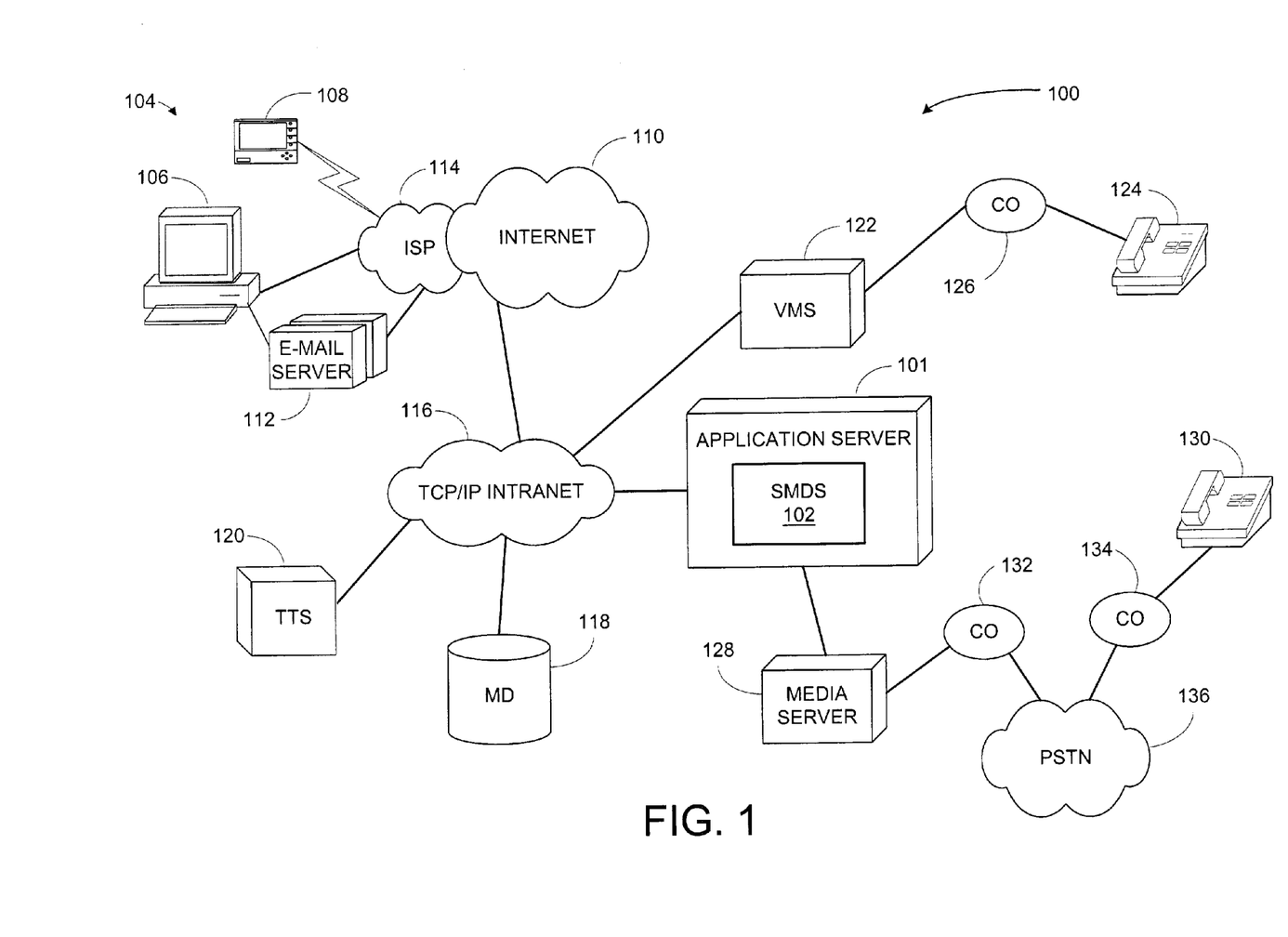
FIG. 1 is diagram of an exemplary telecommunications network interfaced with one embodiment, among others, of the invention.

Referring now to FIG. 1, an exemplary telecommunications network 100 interfaced to one embodiment, among others, of a silent message delivery system (SMDS) 102 is shown. The telecommunications network 100 includes a message source node 104. The message source node 104 may include one or more means for submission of a text (i.e., written, typed, etc.) message within the telecommunications network 100. For example, the message source node 104 may include a computer device 106 such as a personal computer (PC) or workstation. As another example, the message source node 104 may include a portable text messaging device 108 such as a digital pager or personal digital assistant (PDA).

As depicted in FIG. 1, a computer device 106 is typically interfaced to the telecommunications network 100 via the Internet 110 for the purpose of submitting text messages. For example, the computer device 106 may submit messages within the telecommunications network 100 as electronic mail (i.e., e-mail) messages. Such e-mail messages may be delivered to the Internet 110 via a local e-mail server 112, for example, which is interfaced to an internet service provider (ISP) 114. As also depicted in FIG. 1, the computer device 106 may interface to the Internet 110 directly via an ISP 114—in such cases, the computer device typically accesses an Internet-based e-mail system in order to submit text messages to the telecommunications network 100.

A portable text messaging device 108 may also interface to the telecommunications network 100 via the Internet 110. As depicted, the text messaging device typically submits text messages to the Internet 110 via a wireless link (e.g., RF communications) to an ISP 114. The ISP 114 in turn interfaces the wireless link of the text messaging device 108 to the Internet 110.

As shown in FIG. 1, a TCP/IP (i.e., transmission control protocol/internet protocol) intranet 116 also interfaces with the Internet 110, possibly via another internet service provider (not depicted). It is noted that other types of networks, which may be known in the art, could be used in addition to or in lieu of the TCP/IP intranet 116. The TCP/IP intranet 116 interfaces with several other elements within the telecommunications network 100 in accordance with the invention. The TCP/IP intranet 116 interfaces a silent message delivery system 102 (typically via an application server 101), which will be described in more detail below. The TCP/IP intranet 116 also interfaces with a messaging directory (MD) 118, such as the messaging directory described in the co-pending U.S. patent application entitled "Validating Transactions Within A Regional Messaging System," having Ser. No. 09/513,005, which is entirely incorporated herein by reference. The TCP/IP intranet 116 may also interface to a text-to-speech converter (TTS) 120. Finally, as depicted, the TCP/IP intranet also interfaces to a voice mail system (VMS) 122.

Preferably, the messaging directory 118 is an information database of silent messaging service subscribers. The messaging directory 118 may also hold information about other types of subscribers, for example voice mail service subscribers. The subscriber information stored in the messaging directory 118 includes information that facilitates the silent delivery (i.e., without initiating a call to a telephone) of a submitted text message as a voice (i.e., speech) message to a subscriber. For example, the messaging directory may store voice mail system identifiers and voice mailbox identifiers of subscribers. This silent messaging delivery process is directly related to the silent message delivery system 102 and will be discussed in further detail subsequently.

The text-to-speech converter 120 converts a text message to a corresponding voice message that is stored as an audio message file in one or more of various file formats, for example WAV, 32K, or ADPCM, among others, which may be known in the art. Typically, a text-to-speech converter 120 is configured to receive a text message in one or more of various file formats. The text-to-speech converter 120 may be locally interfaced to the TCP/IP intranet 116, as depicted in FIG. 1, or may be interfaced to the TCP/IP intranet 116 via other elements of the telecommunications network 100. For example (not depicted in FIG. 1), the text-to-speech converter 120 may be interfaced to the TCP/IP intranet 116 via the Internet 110. As another example, the text-to-speech converter 120 may be embodied in a media server, such as the media server 128 that will be described below, or the text-to-speech converter 120 may operate on a common application platform (such as the application server 101) with the silent message delivery system 102 and be accessed via an application program interface (API). There are numerous techniques and algorithms to accomplish the text-to-speech conversion performed by the text-to-speech converter 120, as is known in the art, all of which are within the scope of the invention.

The voice mail system 122 may be a networked voice mail system or some similar system that provides voice mail services. Typically the voice mail system 122 provides a voice mail system subscriber with services such as storage and retrieval of voice messages. The voice mail system 122 also typically provides various other related services such as voice notification of a received message or forwarding of stored messages. The voice mail system 122 may be located remote to a subscriber's location, for example at a telecommunications service facility, or the voice mail system 122 may be located local to a subscriber's location, for example within a corporate office building where the subscriber works. Access to the voice mail system 122, for example to submit or retrieve messages, is typically made via voice telephone communications systems. For example, as depicted in FIG. 1, the voice mail system 122 may interface with a telephonic device 124 (e.g., a telephone) via a central office (CO) 126 in a telephonic communications system. The interface between the voice mail system 122 and the TCP/IP intranet 116 is typically made by TCP/IP, although the interface may be accomplished by other known techniques in the art.

As briefly discussed above, the silent message delivery system 102 also interfaces with the TCP/IP intranet 116, typically via the application server 101 as depicted. The interface between the silent message delivery system 102 and the TCP/IP intranet 116 is also typically made by TCP/IP, although the interface may be accomplished by other known techniques in the art. As depicted in FIG. 1, the silent message delivery system 102 may also be interfaced to a media server 128 (also typically via the application server 101). The media server 128 is capable of delivering a voice message to a telephonic device via a telephonic communications system. For example, the media server may be interfaced to a telephonic device 130 (e.g., a telephone) via one or more central offices 132, 134 which are interfaced to one or more public switched telephone networks (PSTN) 136.

Figure 2:
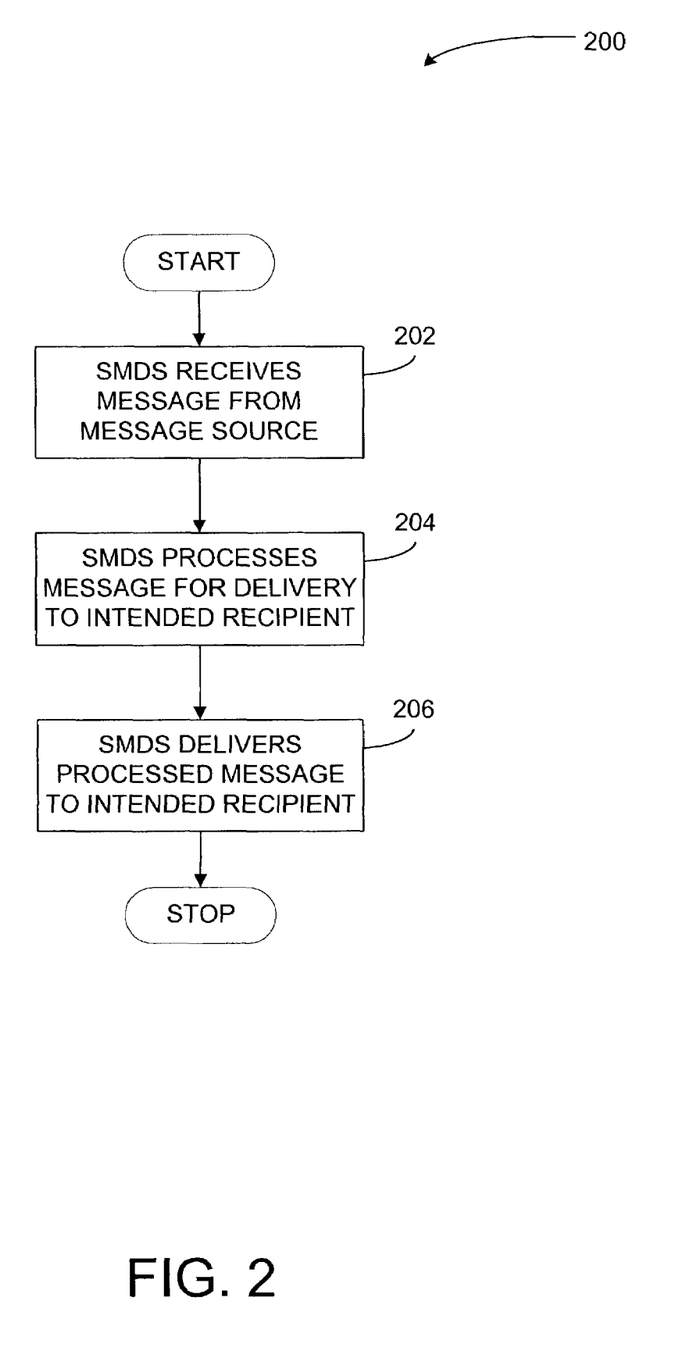
FIG. 2 is a flowchart that illustrates the operation of an embodiment of the invention such as that depicted in FIG. 1.

Generally, the silent message delivery system 102 is configured to receive a text (i.e., written, typed, etc.) message and deliver a corresponding voice (i.e., speech) message. In that regard, reference is now made to FIG. 2. FIG. 2 shows a flowchart 200 that illustrates the operation of an embodiment of the silent message delivery system 102 such as that depicted in the exemplary telecommunications network diagram of FIG. 1. In that regard, the operation of the silent message delivery system 102 starts with a step 202 in which the silent message delivery system 102 receives a text (i.e., written, typed, etc.) message from the message source node 104. For example, a text message may be submitted as an e-mail message using a computer device 106 or a portable text messaging device 108. The text message is delivered to the silent message delivery system 102 via the Internet 110 and the TCP/IP intranet 116 which interface the silent message delivery system 102 to the message source node 104.

Following step 202, the operation of the silent message delivery system 102 proceeds to a step 204 in which the silent message delivery system 102 processes the received text message for delivery to an intended recipient as a corresponding voice (i.e., speech) message. Processing typically includes conversion of the received text message to a voice message by use of a text-to-speech converter 120 that is accessed, for example, via the TCP/IP intranet 116. The processing of step 204 typically also includes querying a messaging directory 118 in an attempt to obtain contact information about the intended recipient that may be stored in the messaging directory.

A step 206 follows the step 204 in which the silent message delivery system 102 delivers the processed voice message to the intended recipient. In this step 206, the silent message delivery system 102 may deliver the voice message to a voice mail system 122 if the intended recipient is a silent messaging subscriber who has contact information stored in the messaging directory 118. This delivery of the voice message to the voice mail system 122 is typically executed without initiating a call to the subscriber's telephonic device. The voice message may then be accessed by the intended recipient using a telephonic device 124 which may, for example, access the voice mail system 122 via a central office 126 in a telephonic communications system.

Alternately in step 206, the silent message delivery system 102 may deliver the voice message directly to the telephonic device 130 of the intended recipient if the recipient is not a silent messaging subscriber and, thus, does not have contact information stored in the messaging directory 118. Typically this delivery is implemented by the silent message delivery system 102 delivering the message to a media server 128. The silent message delivery system 102 instructs the media server to initiate a call to the intended recipient's telephonic device 130 and deliver the voice message to the intended recipient when the telephonic device 130 is answered, for example, by the intended recipient or a voice mail system. The telephonic device 130 may be accessed by the media server 128, for example, via one more central offices 132, 134 that are interconnected by a public switched telephone network 136.

Figure 3:
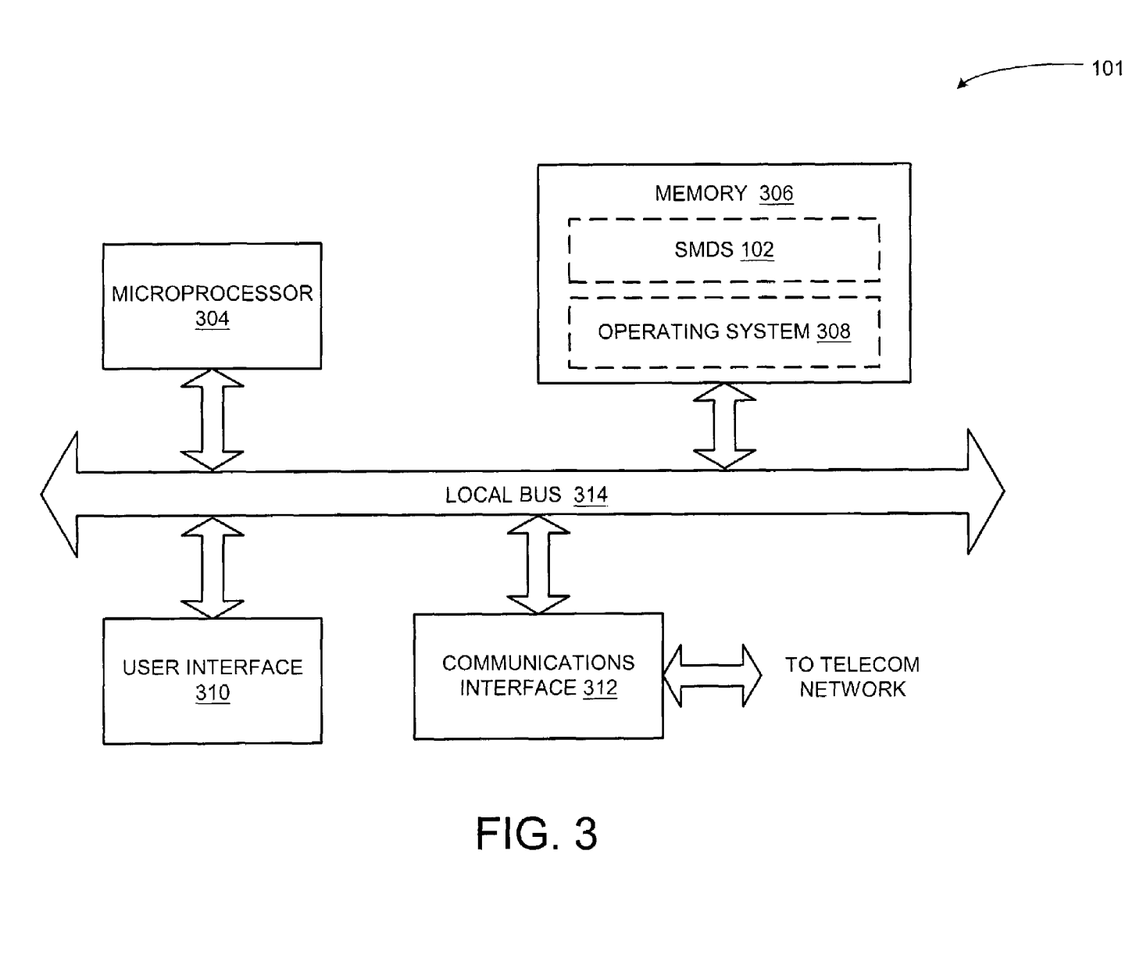
FIG. 3 is a block diagram of an exemplary architecture of an application server that includes an embodiment of the invention such as that depicted in FIG. 1.

FIG. 3 is a block diagram of an exemplary architecture of the application server 101 that includes an embodiment of the silent message delivery system (SMDS) 102. The application server 101 includes a local bus 314 which typically serves as a local interface between the components of the application server 101. A microprocessor 304 is typically interfaced to the local bus 314 and controls the overall operation of the application server 101. The application server 101 also typically has a memory 306 which may include various types of read-only memory (ROM), random-access memory (RAM), and fixed storage media (e.g., a hard-drive disk). As depicted in FIG. 3, the memory 306 of the application server 101 typically stores an operating system 308 that provides instructions that are executed by the microprocessor 304 to control the application server 101. The silent message delivery system 102 is also stored as an application in the memory 306, and the silent message delivery system 102 is also typically executed by the microprocessor 304.

The application server 101 also typically includes a user interface 310 which may include components such as a keyboard or display monitor. The user interface 310 typically provides a user of the application server 101 with means to submit and receive data from the application server 101. Additionally, the application server 101 includes a communications interface 312 which provides an interface to a telecommunications network and/or other elements that are not part of the application server 101. Thus, the silent message delivery system 102 may be executed by the application server 101 to receive a text (i.e., written, typed, etc.) message from a message source and deliver a corresponding voice (i.e., speech) message to an intended recipient, for example, according to the operation illustrated in the flowchart of FIG. 2 which was described above.

Figure 4:
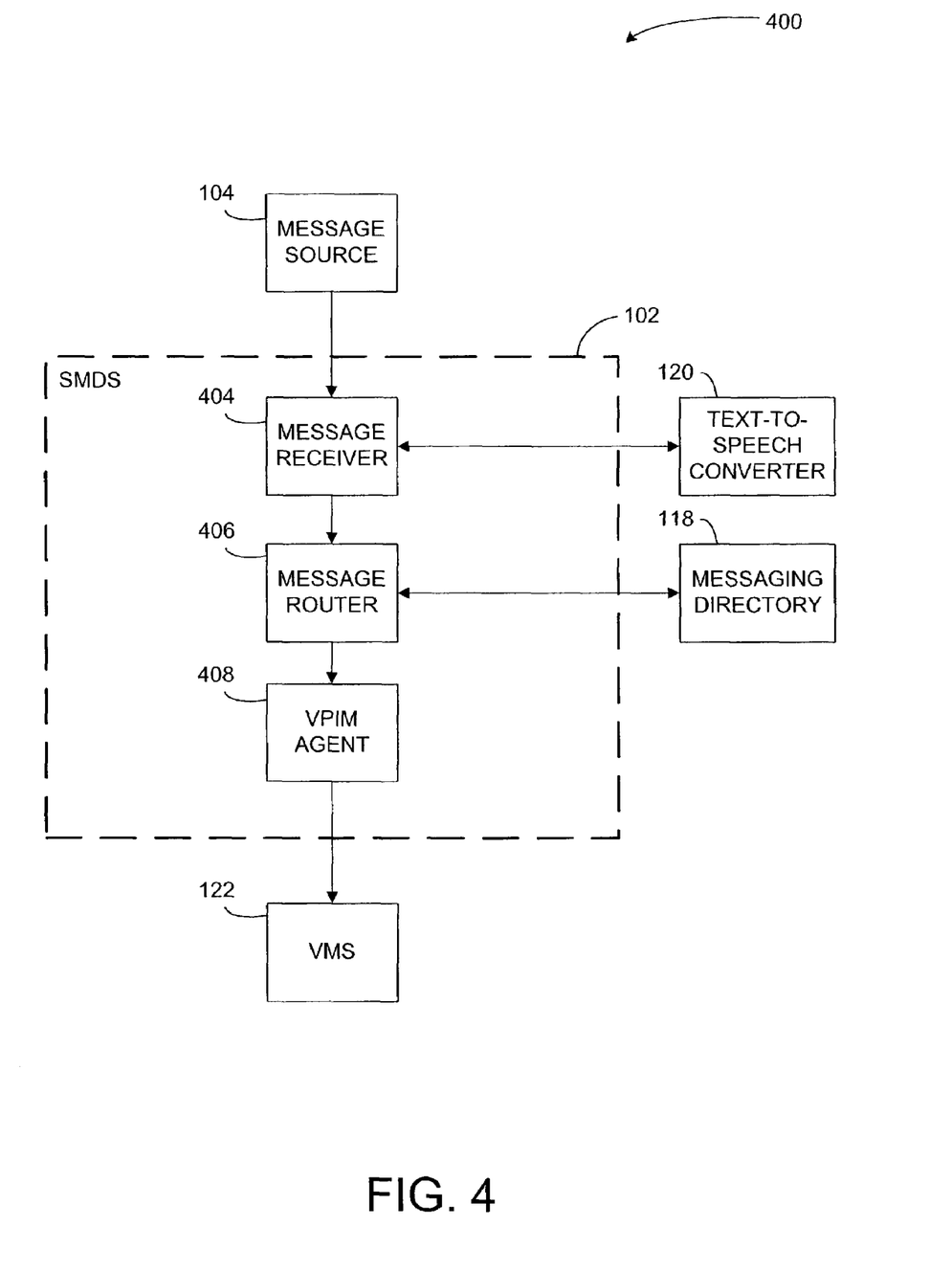
FIG. 4 is a block diagram that shows selected functional elements of an embodiment of the invention interacting with other elements of the telecommunications network depicted in FIG. 1.

FIG. 4 shows a block diagram 400 of selected functional elements of an embodiment of the silent message delivery system 102 interacting with other elements of the telecommunications network 100 depicted in FIG. 1. As shown, the silent message delivery system 102 includes a message receiver 404. The message receiver 404 provides an interface to receive text (i.e., written, typed, etc.) messages from a message source 104. The message receiver 404 is capable of interfacing by various communications protocols, for example TCP/IP, so that the message sender has a versatile and reliable interface to access the silent message delivery system 102 via the message source 104. As discussed above with respect to FIG. 1, the message source 104 typically includes a means for submission of a text message, such as a computer device or a portable text messaging device. A typical text message sent from a message source 104 may be defined, for example, using an XML (i.e., eXtensible Markup Language) document protocol. An example of a text message defined by an XML document protocol will be discussed below with regard to FIG. 8.

The message receiver 404 also interfaces to a text-to-speech converter 120. As discussed above with respect to FIG. 1, the text-to-speech converter 120 converts a text message to a corresponding voice (i.e., speech) message. Further, the text-to-speech converter may be implemented by any of numerous text-to-speech techniques and algorithms that are known in the art. It is noted that the text-to-speech converter 120 could alternately be interfaced to other elements of the silent message delivery system 102 in accordance with the invention.

The message receiver 404 is linked to a message router 406 within the silent message delivery system 102. The message router 406 receives the converted voice message from the message receiver 404 and determines the appropriate delivery routing of the voice message to the intended recipient. The message router 406 is interfaced to a messaging directory 118. As discussed above with respect to FIG. 1, the messaging directory 118 preferably essentially includes an information database of silent messaging service subscribers and, possibly, of other types of subscribers. The message router 406 communicates with the messaging directory 118 to determine if the intended recipient is a silent messaging service subscriber. Based on the determination, the message router 406 routes the voice message to the Voice Profile for Inter-system Messaging (VPIM) agent 408. The VPIM agent 408 is exemplary of one type of voice mail format conversion agent among others which may be known in the art and whose implementation as part of the silent message delivery system 102 are included within the scope of the present invention.

The message router 406 is linked to the VPIM agent 408, as depicted in FIG. 4. The VPIM agent 408 converts a voice message that is routed to it by the message router 406 to a corresponding VPIM message. As discussed above, other types of voice mail format conversion agents may be implemented as part of the silent message delivery system 102, in which case such agent would convert the voice message received from the message router 406 to a message in a corresponding voice mail format. The VPIM agent 408 also establishes a connection to the voice mail system 122 of the intended recipient and delivers the VPIM message to the voice mail system 122. The VPIM agent 408 typically connects to the voice mail system 122 using internet connectivity and/or TCP/IP. As discussed above with respect to FIG. 1, the voice mail system 122 may be a networked voice mail system or some similar system that provides voice mail services and it is typically accessed via telephonic communications systems.

Although not depicted in FIG. 4, the silent message delivery system 102 may also include a delivery confirmation notifier linked to the VPIM agent 408 and interfaced to the message source 104. Such a delivery confirmation notifier would deliver a delivery confirmation message received from the VPIM agent 408 to the message source 104 in the form of a compatible text message.

Figure 5:
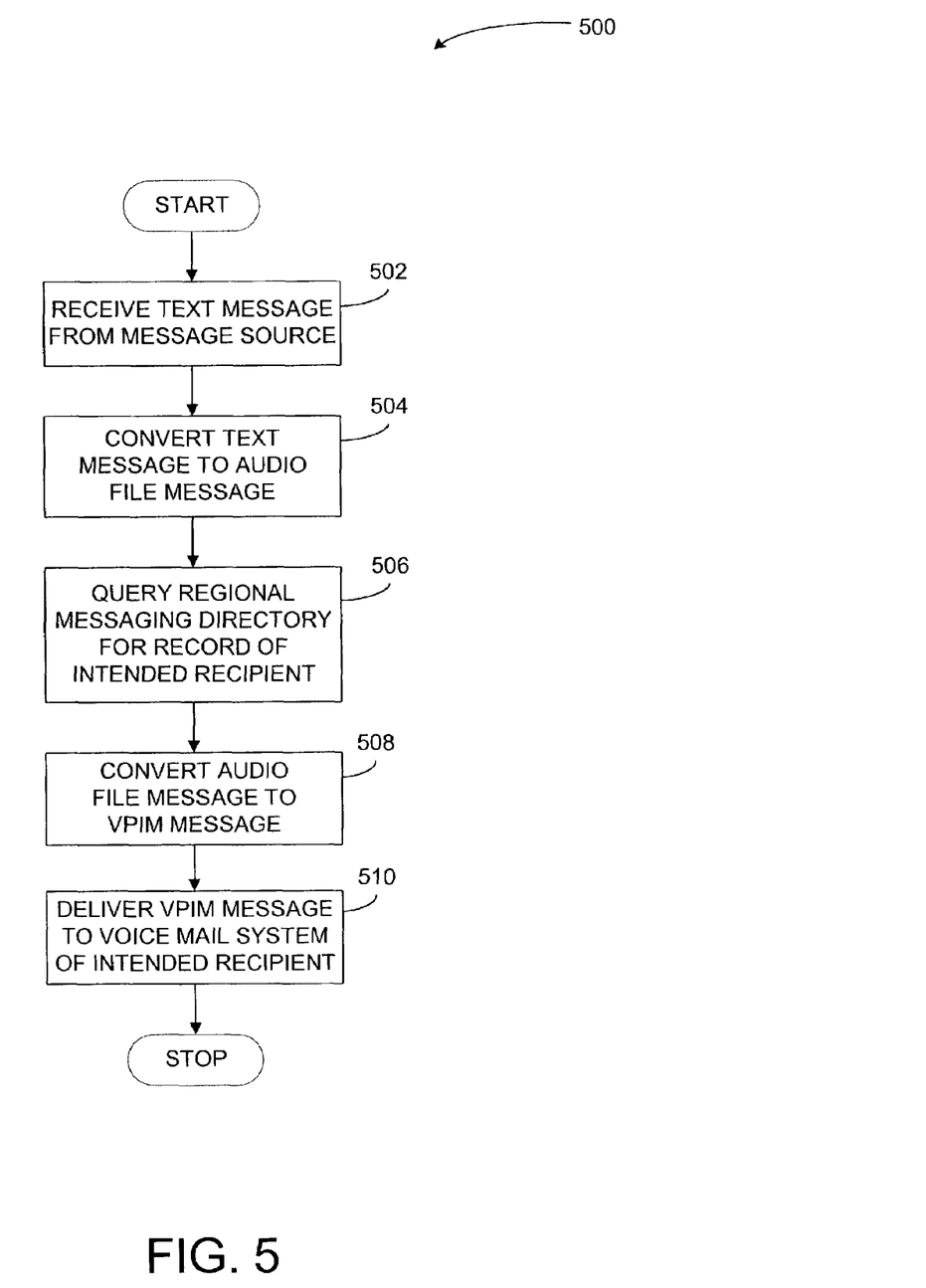
FIG. 5 is a flowchart that illustrates the operation of an embodiment of the invention such as that depicted in FIG. 4.

FIG. 5 shows a flowchart 500 that illustrates the operation of an embodiment of the silent message delivery system 102 such as that depicted in the block diagram of FIG. 4. In that regard, the operation of the silent message delivery system 102 starts with a step 502 in which the message receiver 404 receives a text (i.e., written, typed, etc.) message from the message source 104. The text message typically includes the telephone number of the intended recipient and may include additional information as well. The text message may be delivered to the message receiver 404 in various formats, such as an XML document, for example. Further, the text message may be delivered to the message server 404 from the message source 104 using various transport protocols such as TCP/IP, for example.

A step 504 follows the step 502 in which the text message received by the message receiver 404 is converted to a voice (i.e., speech) message. This conversion is typically made by a text-to-speech converter 120 that is interfaced to the message receiver 404. It is noted that the text-to-speech conversion of the text message could be implemented at other steps of the flowchart 500, in accordance with the invention—typically, the text-to-speech conversion is implemented prior to a subsequent conversion of the message, for example, to a VPIM message. In the step 504, the text message is typically converted to a corresponding audio message file (i.e., a voice message) that includes the telephone number of the intended recipient and may also include other information that was originally included in the text message.

Following the step 504 is a step 506 in which the message router 406 queries the messaging directory 118 for silent messaging system subscriber information related to the intended message recipient. The message router 406 uses contact information, such as the intended recipient's telephone number, that is obtained from the audio message file passed on to the message router 406 from the message receiver 404 to accomplish such queries. In the step 506, the message router 406 queries the messaging directory 118 for a subscriber record that corresponds to the contact information of the intended message recipient. The message router 406 obtains additional information from the record found in the messaging directory 118, such as the subscriber's voice mail system identifier and voice mailbox identifier, that is used to the route the audio message to the voice mail system 122 of the intended recipient.

Following step 506, in the step 508, the VPIM agent 408 converts the audio message file to a VPIM message. The VPIM message typically includes the voice message, the subscriber's voice mail system identifier, and the subscriber's voice mailbox identifier. An example of a VPIM message will be discussed below with respect to FIG. 9. Following the step 508, in the step 510, the VPIM agent 408 establishes a connection to the subscriber's (i.e., the intended recipient's) voice mail system 122, typically by internet connectivity and/or TCP/IP, and delivers the VPIM message to the voice mail system 122. The VPIM message is delivered to the intended recipient's voice mailbox as an audio message and this delivery occurs without initiating a call to the intended recipient's telephonic device. Thus, the text message from the message source 104 is silently delivered as an audio message to the intended recipient's voice mail system 122 by the silent message delivery system 102.

Although not depicted in the flowchart of FIG. 5, if the silent message delivery system 102 included a delivery confirmation notifier (as discussed above), the delivery confirmation notifier would establish a connection to the message source 104, for example by internet connectivity and/or TCP/IP, and deliver a delivery confirmation message to it in a step following the step 510. Typically, this delivery confirmation message would indicate to the message sender that the sent text message has been delivered as an audio message to the voice mail system 122 of the intended recipient. Such a delivery confirmation message may also indicate other message delivery status information, such as, among other possibilities within the scope of the invention, an unsuccessful delivery of the message to the voice mail system 122 of the intended recipient. The delivery confirmation notifier might, for example, deliver the delivery confirmation message as an e-mail in SMTP (Simple Message Transfer Protocol), however other types of messages might be delivered alternately.

Figure 6:
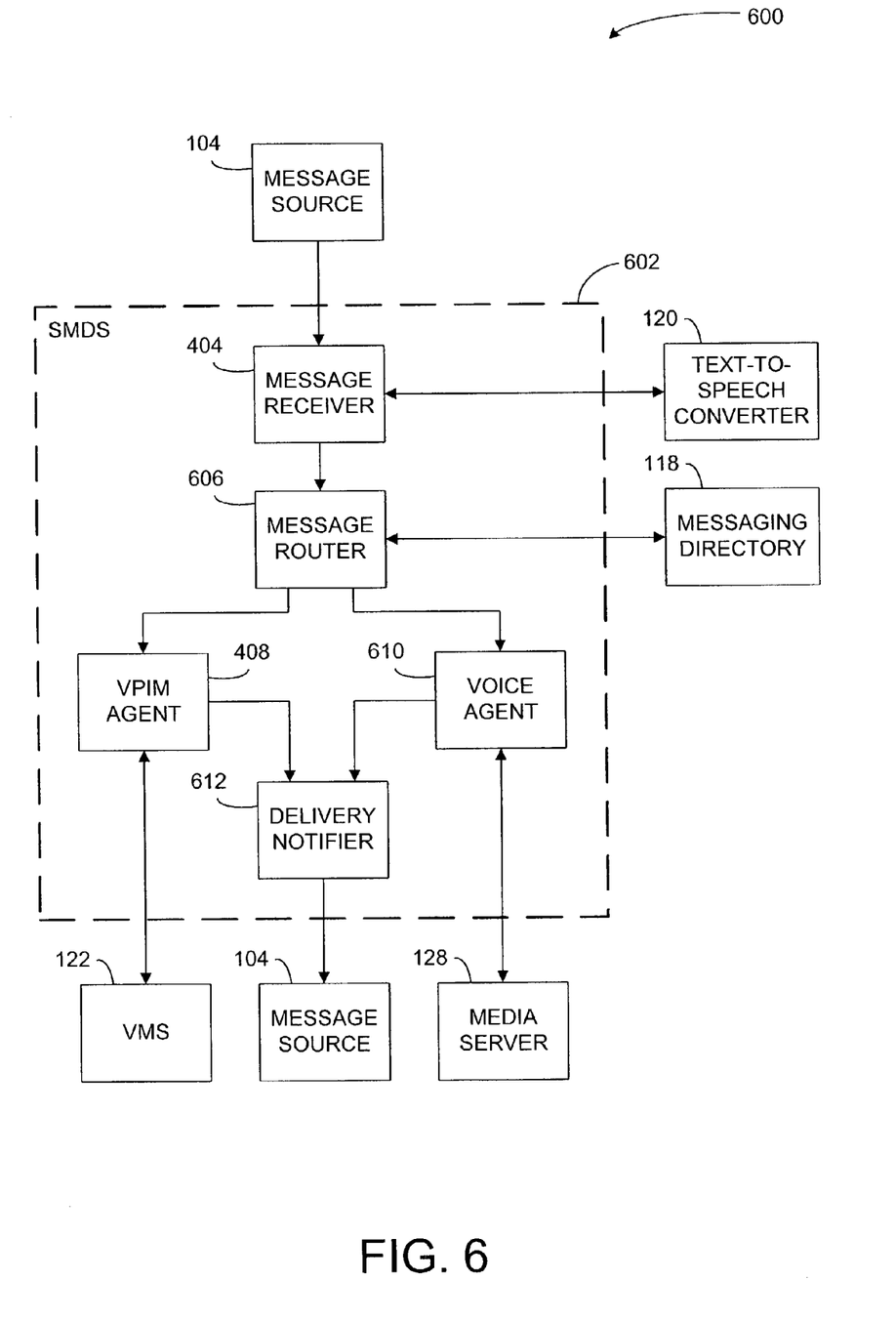
FIG. 6 is a block diagram that shows the functional elements of another embodiment of the invention such as that depicted in FIG. 1.

FIG. 6 shows a block diagram 600 of the functional elements of another embodiment of a silent message delivery system 602. As shown, the silent message delivery system 602 includes a message receiver 404. As discussed above with respect to FIG. 4, the message receiver 404 provides an interface to receive text (i.e., written, typed, etc.) messages from a message source 104. As discussed above with respect to FIG. 1, the message source 104 typically includes a means for submission of a text message, such as a computer device or a portable text messaging device. A typical text message sent from a message source 104 may be defined, for example, using an XML (i.e., eXtensible Markup Language) document protocol. An example of a text message defined by an XML document protocol will be discussed below with respect to FIG. 8.

The message receiver 404 also interfaces to a text-to-speech converter 120. As discussed above with respect to FIG. 1, the text-to-speech converter 120 converts a text message to a corresponding voice (i.e., speech) message. Further, the text-to-speech converter may be implemented by any of numerous text-to-speech techniques and algorithms that are known in the art. It is noted that the text-to-speech converter 120 could alternately be interfaced to other elements of the silent message delivery system 602 in accordance with the invention.

The message receiver 404 is linked to a message router 606 within the silent message delivery system 602. The message router 606 receives the converted voice message from the message receiver 404 and determines the appropriate delivery routing of the voice message to the intended recipient. The message router 606 is interfaced to a messaging directory 118. As discussed above with respect to FIG. 1, the messaging directory 118 is essentially an information database of silent messaging service subscribers and, possibly, of other types of subscribers. The message router 606 communicates with the messaging directory 118 to determine if the intended recipient is a silent messaging service subscriber. Based on the determination, the message router 606 routes the voice message to the VPIM agent 408 or the voice agent 610.

The message router 606 is linked to the VPIM agent 408. As discussed above with respect to FIG. 4, the VPIM agent 408 converts a voice message that is routed to it by the message router 606 to a corresponding VPIM message. The VPIM agent 408 also establishes a connection to the voice mail system 122 of the intended recipient, typically by internet connectivity and/or TCP/IP, and delivers the VPIM message to the voice mail system 122. As discussed above with respect to FIG. 1, the voice mail system 122 may be a networked voice mail system or some similar system that provides voice mail services and it is typically accessed via telephonic communications systems.

The message router 606 is also linked to the voice agent 610. The voice agent 610 establishes a connection with a media server 128, for example by internet connectivity and/or TCP/IP, and delivers a voice message to the media server 128 that has been routed to it from the message router 606. The voice agent 610 also causes the voice message to be delivered via the media server 128 to the telephonic device of the intended recipient.

As depicted in FIG. 6, the VPIM agent 408 and the voice agent 610 may each also be linked to a delivery confirmation notifier 612. The delivery confirmation notifier 612 delivers a delivery confirmation message received from either the VPIM agent 408 or the voice agent 610 to the message source 104 in the form of a compatible text message.

Figure 7:
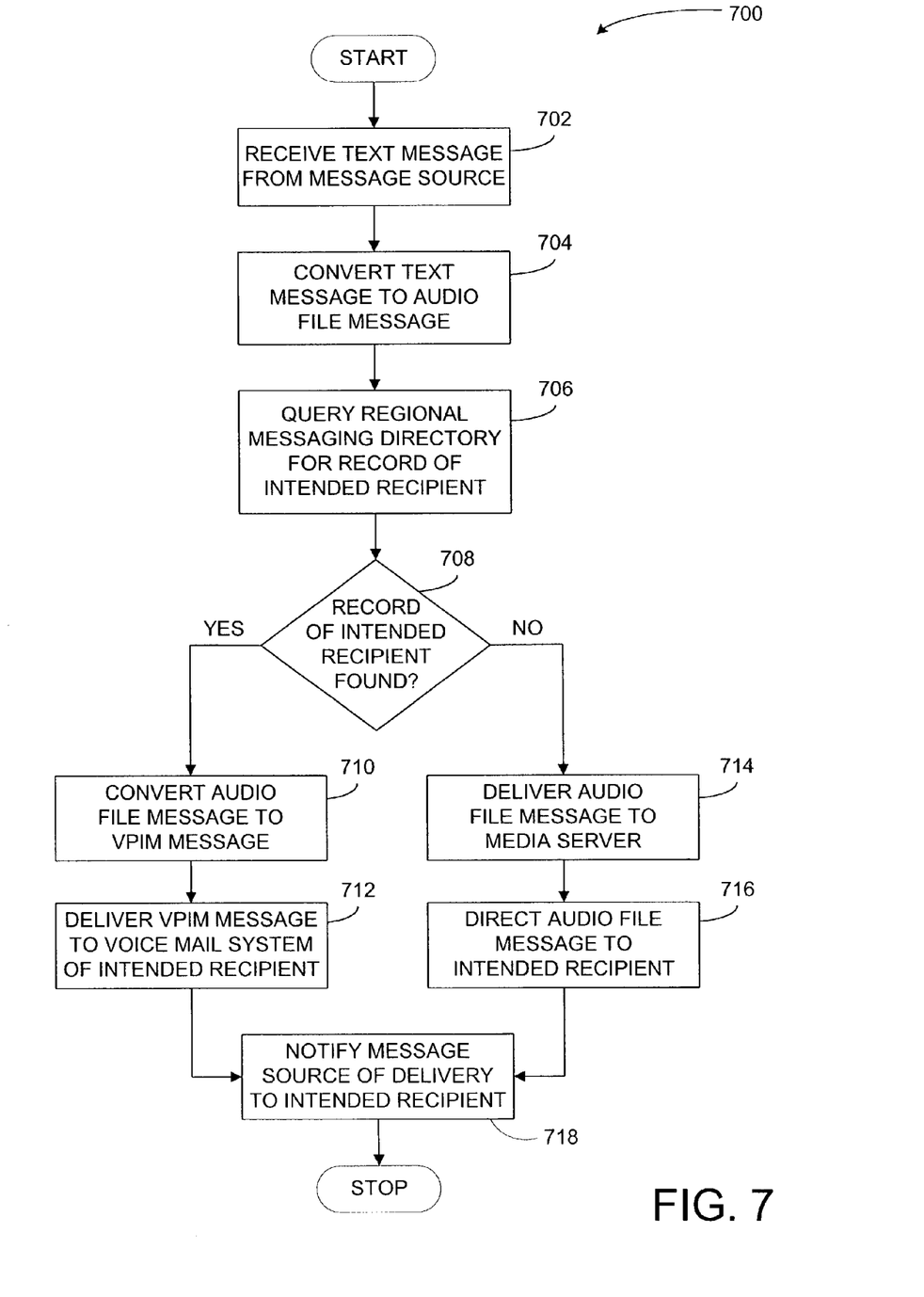
FIG. 7 is a flowchart that illustrates the operation of another embodiment of the invention such as that depicted in FIG. 6.

FIG. 7 shows a flowchart 700 that illustrates the operation of an embodiment of the silent message delivery system 602 such as that depicted in the block diagram of FIG. 6. In that regard, the operation of the silent message delivery system 602 starts with a step 702 in which the message receiver 404 receives a text (i.e., written, typed, etc.) message from the message source 104. The text message typically includes the telephone number of the intended recipient and may include additional information as well. The text message may be delivered to the message receiver 404 in various formats, such as an XML document, for example. Further, the text message may be delivered to the message receiver 404 from the message source 104 using various transport protocols such as TCP/IP, for example.

A step 704 follows the step 702 in which the text message received by the message receiver 404 is converted to a voice (i.e., speech) message. This conversion is typically made by a text-to-speech converter 120 that is interfaced to the message receiver 404. It is noted that the text-to-speech conversion of the text message could be implemented at other steps of the flowchart 700, in accordance with the invention—typically, the text-to-speech conversion is implemented prior to a subsequent conversion of the message, for example, to a VPIM message. In the step 704, the text message is typically converted to a corresponding audio message file (i.e., a voice message) that includes the telephone number of the intended recipient and may also include other information that was originally included in the text message.

Following the step 704 is a step 706 in which the message router 606 queries the messaging directory 118 to determine if the intended message recipient is a silent messaging system subscriber. The message router 606 uses contact information, such as the intended recipient's telephone number, that is obtained from the audio message file passed on to the message router 606 from the message receiver 404 to accomplish such queries. In the step 706, the message router 606 queries the messaging directory 118 for a subscriber record that corresponds to the contact information of the intended message recipient. If there is a corresponding record found in the messaging directory 118, the message router 606 obtains additional information from the record, such as the subscriber's voice mail system identifier and voice mailbox identifier, that is used to the route the audio message to the voice mail system 122 of the intended recipient.

In a step 708, which follows the step 706, the message router 606 determines the appropriate routing of the audio message file dependent on whether a subscriber record is found in the messaging directory 118. If a subscriber record is found that corresponds to the contact information of the intended message recipient, the message router 606 routes the audio message file to the VPIM agent 408, which corresponds with a progression to the step 710 of the flowchart 700. Alternately, if there is no subscriber record found that corresponds to the intended recipient, the message router 606 routes the audio message file to the voice agent 610, which corresponds with a progression to the step 714 of the flowchart 700.

In the step 710, the VPIM agent 408 converts the audio message file to a VPIM message. The VPIM message typically includes the voice message, the subscriber's voice mail system identifier, and the subscriber's voice mailbox identifier. An example of a VPIM message will be discussed below with respect to FIG. 9. Following the step 710, in the step 712, the VPIM agent 408 establishes a connection to the subscriber's (i.e., the intended recipient's) voice mail system 122, for example by internet connectivity and/or TCP/IP, and delivers the VPIM message to the voice mail system 122. The VPIM message is delivered to the intended recipient's voice mailbox as an audio message and this delivery occurs without initiating a call to the intended recipient's telephonic device. Thus, the text message from the message source 104 is silently delivered as an audio message to the intended recipient's voice mail system 122 by the silent message delivery system 602.

In the step 714, the voice agent 610 selects an appropriate media server 128 and establishes a connection to it, for example, by internet connectivity and/or TCP/IP. The voice agent 610 then delivers the audio message file, including the intended recipient's telephone number, to the media server 128. Following the step 714, in the step 716, the voice agent 610 instructs the media server 128 to call the telephonic device of the intended message recipient and play the audio message file when the telephonic device is answered.

Following either the step 712 or the step 716 is a step 718 in which the delivery confirmation notifier 612 establishes a connection to the message source 104, for example by internet connectivity and/or TCP/IP, and delivers a delivery confirmation message to it. This delivery confirmation message typically indicates to the message sender that the sent text message has been delivered as an audio message to either the voice mail system 122 of the intended recipient or to the telephonic device of the intended recipient via the media server 128. However, a delivery confirmation message may also indicate other message delivery status information, such as, among other possibilities within the scope of the invention, an unsuccessful delivery of the message to the voice mail system 122 of the intended recipient. The delivery confirmation notifier 612 may, for example, deliver the delivery confirmation message as an e-mail in SMTP (Simple Message Transfer Protocol), however other types of messages may be delivered alternately.

Figure 8:
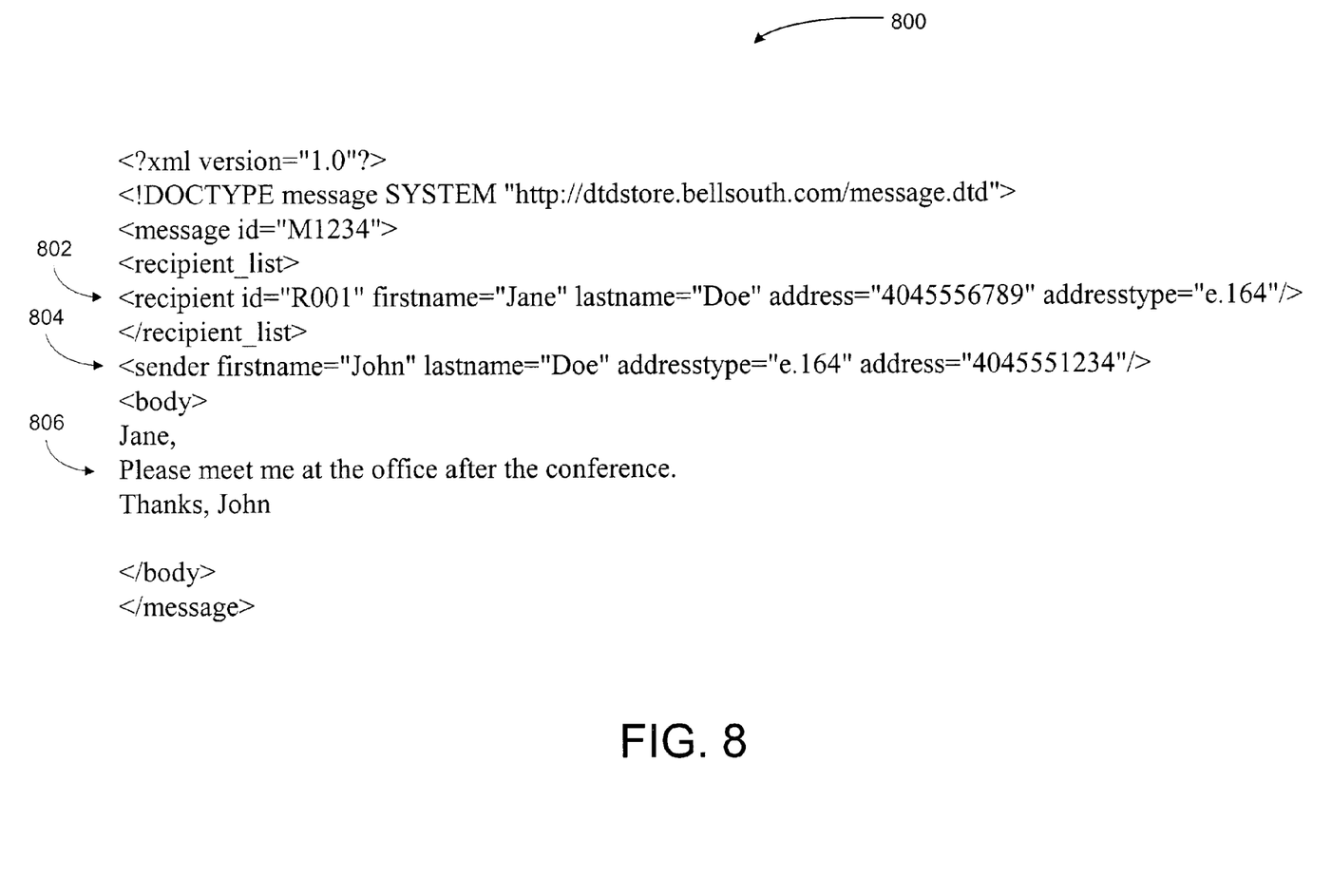
FIG. 8 is an example of a text message defined by an XML document protocol that may be sent to an embodiment of the present invention.

FIG. 8 shows an example of a text message 800 defined by an XML (i.e., eXtensible Markup Language) document protocol that may be sent from a message source to an embodiment of the silent message delivery system, for example as described above with respect to FIGS. 4-7. As shown in FIG. 8, the XML text message 800 typically includes recipient information 802, among other features shown, such as the intended message recipient's name and address. As shown, the intended recipient's address is typically a phone number, such as the intended recipient's office or home phone number. As discussed above, the recipient information 802 is typically used by the message router of the silent message delivery system to determine the appropriate delivery routing of the message 800 to the intended recipient.

The XML text message 800 also typically includes sender information 804 such as the message sender's name and address. The sender's address may also be a phone number, as shown, although other information, such as the sender's e-mail address, may be used alternately. The sender information 804 may be used, for example, by the delivery confirmation notifier of the silent message delivery system to send a delivery confirmation to the sender of the message 800. Finally, the XML text message 800 typically includes a message 806 that the message sender intends for the recipient to receive as a voice message on the recipient's voice mail system. It is noted that the XML text message 800 discussed in the foregoing is merely exemplary, and other variations of a text message defined by an XML document protocol or some other protocol may be sent from a message source to an embodiment of the silent message delivery system in accordance with the invention, as may be apparent to those skilled in the art.

Figure 9:
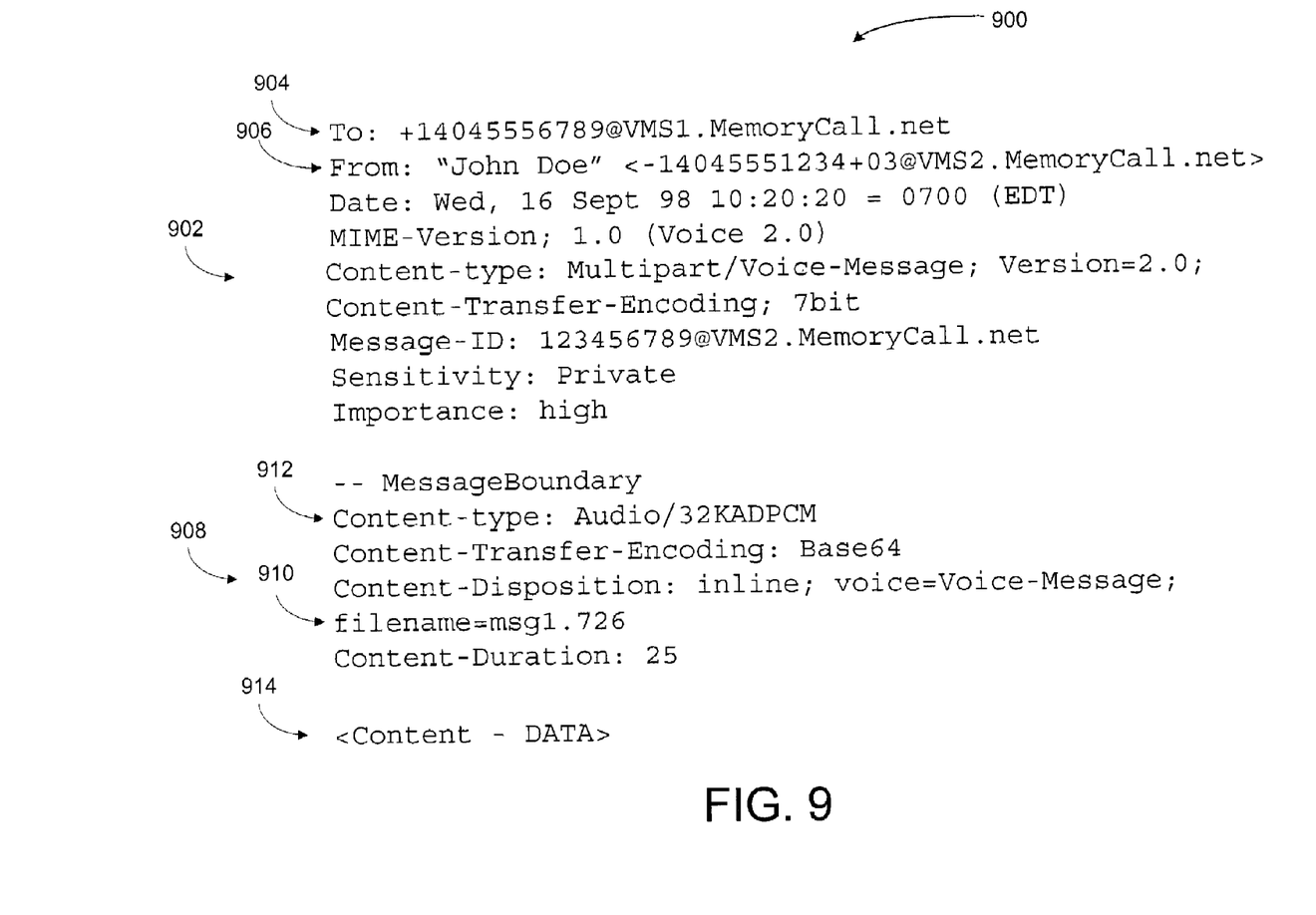
FIG. 9 is an example of a Voice Profile for Inter-system Messaging (VPIM) message that may be created and delivered to a voice mail system by the present invention.

FIG. 9 shows an example of a VPIM message 900 that may be created and delivered to a voice mail system by a VPIM agent of an embodiment of the silent message delivery system, for example as described above with respect to FIGS. 4-7. As shown in FIG. 9, the VPIM message 900 may have a format that is similar to an SMTP (i.e., Simple Mail Transfer Protocol) e-mail message. In that regard, the VPIM message 900 typically includes a header 902. As shown, the header 902 includes a To field 904. The To field 904 typically includes the intended recipient's phone number, which may correspond to the address in the recipient information 802 discussed above with respect to FIG. 8. As shown, the recipient's phone number in the To field 904 is typically appended to form an Internet e-mail address which is typically used to deliver the message 900 by TCP/IP or other Internet protocol. The VPIM message header 902 also typically includes a From field 906 which includes the sender's name and phone number. The sender's phone number may correspond to the address in the sender information 804 discussed above with respect to FIG. 8. Moreover, the sender's phone number in the From field 906 is typically appended to form an Internet e-mail address which may be used, for example, by the delivery confirmation notifier of the silent message delivery system to send a delivery confirmation message to the sender of the message 900.

The VPIM message 900 also typically includes message description information 908, such as the message file name 910 and the message content type 912, among other information. This message description information 908 typically describes the audio message file that is created by the VPIM agent of the silent message delivery system from the text message sent by the sender. Finally, the VPIM message 900 typically includes an actual audio message file 914, which is depicted by text in FIG. 9. As discussed above, for example with respect to FIGS. 4-7, the audio message file 914 is typically a speech version of the text message that has been received from the sender and processed by the silent message delivery system. It is noted that the VPIM message 900 discussed in the foregoing is merely exemplary, and other variations of a VPIM message may be created and delivered by a VPIM agent or possibly by another element of the silent message delivery system in accordance with the invention, as may be apparent to those skilled in the art.

It should be understood that any references made herein to Voice Profile for Inter-system Messaging, VPIM, or the like are merely exemplary of one type of voice mail format among others which may be known in the art and whose implementation are included within the scope of the present invention.

It is noted that embodiments of the silent message delivery system, such as those described above, may be implemented in hardware, software, firmware, or a combination thereof. For example, in some embodiments, the silent message delivery system may be implemented as an computer program or application in software or firmware that is stored in a memory and that is executed by a suitable instruction execution system. In other embodiments the silent message delivery system may be implemented, for example, with one or a combination of the following technologies which are known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is further noted that any process descriptions or blocks in flow charts described above may represent modules, segments, and/or portions of computer program or application code which include one or more executable instructions for implementing specific logical functions or steps in the process. Alternate implementations are included within the scope of the invention in which functions may be executed out of order from that shown in the figures and/or discussed above, including substantially concurrently or in reverse order, depending at least in part on the functionality involved, as will be understood by those skilled in the art.

With regard to any block or network diagrams described above, although the flow of data or other elements may be depicted as unidirectional or bidirectional, such depictions are merely exemplary and not limiting. Variations of the flows depicted in the block or network diagrams are included within the scope of the invention. Furthermore, the functionality of some of the blocks may be implemented by a single combined block within the scope of the invention.

Moreover, embodiments of the silent message delivery system, such as those described above, may comprise an ordered listing of executable instructions for implementing logical functions which can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this disclosure, a "computer-readable medium" may be any means that can contain, store, communicate, propagate, or transport the program for use by or in connection with the instruction execution system, apparatus, or device. The computer readable medium may be, for example but not limited to, an electronic, magnetic, optical, electromagnetic, infrared, or semiconductor system, apparatus, device, or propagation medium. More specific examples (i.e., a non-exhaustive list) of the computer-readable medium include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). It is noted that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Finally, it should be emphasized that the above-described embodiments of the present invention are merely possible examples of implementations set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the invention, and protected by the following claims.

Therefore, having thus described the invention, at least the following is claimed:

1. A system for silent message delivery, comprising:
a message receiver configured to receive a text message from a message source and convert said text message to a corresponding speech message, transmission of said text message to said message receiver being initiated by a message sender and not an intended recipient, said text message identifying said intended recipient and a telephone number of the intended recipient which is used to deliver contents of the text message as a voice message to the intended recipient, the telephone number of the intended recipient being entered in the text message by the message sender;
a message router in communication with said message receiver and configured to route said speech message dependent on information included within said speech message;
a voice mail format conversion agent in communication with said message router and configured to convert said speech message to a corresponding voice mail format message and deliver said voice mail format message to a voice mailbox of the intended recipient residing on a voice mail system, wherein said intended recipient initiates a call to the voice mail system to access the voice mail format message and the voice mail format conversion agent is co-located with the message receiver and the message router; a delivery confirmation notifier in communication with said voice mail format conversion agent and configured to deliver a delivery confirmation message to said message source, said message source comprising a text messaging device;
a voice agent in communication with said message router and configured to deliver said speech message to a media server and cause said media server to deliver said speech message to a telephonic device, wherein said voice agent is in communication with said delivery confirmation notifier; and
wherein said delivery confirmation message indicates the status of the delivery attempt of said voice mail format message to said voice mail system and said speech message to said telephonic device.

2. The system of claim 1, wherein said voice mail format conversion agent is a Voice Profile for Inter-system Messaging (VPIM) agent and said voice mail format message is a VPIM message.

3. The system of claim 1, wherein said voice mail format conversion agent is further configured to deliver said voice mail format message to said voice mail system without initiating a call to a telephonic device.

4. The system of claim 1, wherein said message receiver is in communication with a text-to-speech converter that is implemented by said message receiver to convert said text message to said speech message.

5. The system of claim 1, wherein said message router is in communication with a messaging directory that contains subscriber voice mail system information and said message router is further configured to route said speech message dependent on said voice mail system information.

6. The system of claim 5, wherein said subscriber voice mail system information includes voice mail system identifiers and voice mailbox identifiers.

7. A method for silent message delivery, comprising:
receiving a text message from a message source, the text message including a telephone number of an intended recipient for voice communications, transmission of said text message to a message receiver being initiated by a message sender and not said intended recipient, wherein the telephone of the intended recipient is entered in the text message by the message sender;
converting said text message to a corresponding speech message, the speech message including the telephone number for the intended recipient;
delivering said speech message to the voice mailbox of the intended recipient residing on a voice mail system without initiating a call to a telephonic device, wherein the intended recipient initiates a call to the voice mail system to access the speech message; wherein said converting of said text message comprises delivering said text message to a text-to-speech converter and receiving a corresponding speech message from said converter; wherein said delivering of said speech message comprises:
querying a messaging directory for contact information corresponding to said intended recipient of said speech message;
delivering said speech message to the voice mail system of said intended recipient without initiating a call to the telephonic device of said intended recipient if contact information corresponding to said intended recipient is obtained from said messaging directory, wherein said contact information is used to identify the voice mail system of said intended recipient;
delivering said speech message to a media server and causing said media server to deliver said speech message to the telephonic device of said intended recipient if contact information corresponding to said intended recipient is not obtained from said messaging directory; and
delivering a delivery confirmation message to said message source that indicates the delivery status of said speech message to the telephonic device of said intended recipient.

8. The method of claim 7, wherein said converting of said text message comprises delivering said text message to a text-to-speech converter and receiving a corresponding speech message from said converter.

9. The method of claim 7, further comprising delivering a delivery confirmation message to said message source that indicates the delivery status of said speech message to the voice mail system of said intended recipient, said message source comprising a text messaging device.

* * * * *